(12) United States Patent
Sharp et al.

(10) Patent No.: US 12,483,095 B2
(45) Date of Patent: Nov. 25, 2025

(54) GENERATOR COOLING AND ENCLOSURE VENTILATION SYSTEM

(71) Applicant: STEWART & STEVENSON LLC, Houston, TX (US)

(72) Inventors: Brian Sharp, Houston, TX (US); Eric Evezic, Houston, TX (US); Chris Harvell, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 308 days.

(21) Appl. No.: 18/105,577

(22) Filed: Feb. 3, 2023

(65) Prior Publication Data

US 2023/0291279 A1    Sep. 14, 2023

Related U.S. Application Data

(60) Provisional application No. 63/318,148, filed on Mar. 9, 2022.

(51) Int. Cl.
*F01P 5/02*      (2006.01)
*H02K 9/04*     (2006.01)

(52) U.S. Cl.
CPC ..................................... *H02K 9/04* (2013.01)

(58) Field of Classification Search
CPC ........ F04P 7/048; F04P 5/04; F01P 2005/025; F01P 5/02; F01P 7/026; E02F 9/2095; F02B 63/044; B60H 1/00642; B60H 1/00; B60K 11/04; H02K 9/04; H02K 9/19; F04D 27/004; F04D 29/58; F04D 29/5806
USPC ....................... 123/2–3; 310/53–54; 290/1 B
See application file for complete search history.

(56) References Cited

U.S. PATENT DOCUMENTS

| | | | | |
|---|---|---|---|---|
| 4,164,660 A | * | 8/1979 | Palazzetti | F02B 63/04 237/12.3 B |
| 5,598,705 A | * | 2/1997 | Uzkan | F01P 7/165 60/599 |
| 5,747,883 A | * | 5/1998 | Hammer | H02K 7/116 322/40 |
| 5,915,365 A | * | 6/1999 | Meisinger | F02B 63/04 123/526 |

(Continued)

FOREIGN PATENT DOCUMENTS

| | | | | |
|---|---|---|---|---|
| CN | 213980948 | * | 8/2021 | F01N 3/05 |
| GB | 2541006 | * | 5/2015 | F01P 7/16 |

*Primary Examiner* — Burton S Mullins
(74) *Attorney, Agent, or Firm* — Ewing & Jones, PLLC

(57) ABSTRACT

A system for cooling a generator includes a generator system. The generator system includes a generator, an enclosure, the enclosure surrounding the generator, and a radiator, wherein the radiator is fluidly connected to the generator. The system also includes a radiator and ventilation fan system. The radiator and ventilation fan system includes a controller. The radiator and ventilation fans system also includes a ventilation fan variable frequency drive (VFD), the ventilation fans VFD in electrical communication with the controller and a ventilation fan in electrical communication with the ventilation fans VFD. In addition, the radiator and ventilation fan system includes radiator fans VFD in electrical communication with the controller and a radiator fan in electrical communication with radiator fans VFD. Further, the system includes temperature sensors, the temperature sensors in electrical communication with the controller.

11 Claims, 2 Drawing Sheets

(56) References Cited

U.S. PATENT DOCUMENTS

| | | | | |
|---|---|---|---|---|
| 7,267,086 B2* | 9/2007 | Allen | F02M 26/28 | |
| | | | 123/41.44 | |
| 7,640,760 B2* | 1/2010 | Bash | G05D 23/1931 | |
| | | | 713/300 | |
| 7,863,839 B2* | 1/2011 | Schuricht | F01P 7/044 | |
| | | | 236/35 | |
| 8,151,566 B2* | 4/2012 | Leistner | B64F 1/364 | |
| | | | 60/599 | |
| 8,550,038 B2* | 10/2013 | Marlenee | H02P 9/10 | |
| | | | 290/1 A | |
| 8,677,948 B2* | 3/2014 | Steffi | H02P 9/04 | |
| | | | 123/41.12 | |
| 9,057,317 B2* | 6/2015 | Vuk | B60H 1/00828 | |
| 10,107,189 B2* | 10/2018 | Terada | F02B 63/044 | |
| 10,485,146 B2* | 11/2019 | Daskalos | H05K 7/20909 | |
| 10,903,719 B2* | 1/2021 | Halbert | F04D 19/002 | |
| 10,982,586 B2* | 4/2021 | Sakaray | E02F 9/0866 | |
| 10,995,653 B2* | 5/2021 | Roplekar | F02B 63/042 | |
| 11,391,486 B2* | 7/2022 | Snider | F04D 27/004 | |
| 12,344,463 B2* | 7/2025 | Yan | F02D 29/06 | |
| 2009/0088873 A1* | 4/2009 | Avery | G06F 1/206 | |
| | | | 700/51 | |
| 2011/0016893 A1* | 1/2011 | Dawes | G05B 15/02 | |
| | | | 700/275 | |
| 2011/0042967 A1* | 2/2011 | Winter | H02K 9/19 | |
| | | | 290/1 R | |
| 2013/0235494 A1* | 9/2013 | Holce | H02P 27/047 | |
| | | | 361/31 | |
| 2019/0241060 A1* | 8/2019 | Hara | E02F 9/2095 | |
| 2020/0300550 A1* | 9/2020 | Hall | F28D 15/06 | |
| 2021/0108835 A1* | 4/2021 | Wind, Sr. | F28F 27/00 | |
| 2021/0298195 A1* | 9/2021 | Barbour | G06F 1/181 | |
| 2022/0376546 A1* | 11/2022 | Klepacki | F02M 25/00 | |
| 2023/0303316 A1* | 9/2023 | Yan | F02B 63/048 | |
| 2023/0392537 A1* | 12/2023 | Takes | H01M 8/04074 | |
| 2024/0003287 A1* | 1/2024 | Hufnagel | F01P 7/14 | |

* cited by examiner

GENERATOR COOLING AND ENCLOSURE VENTILATION SYSTEM

CROSS-REFERENCE TO RELATED APPLICATIONS

This application is a nonprovisional application which claims priority from U.S. provisional application No. 63/318,148, filed Mar. 9, 2022, which is incorporated by reference herein in its entirety.

TECHNICAL FIELD/FIELD OF THE DISCLOSURE

The present disclosure relates generally to generators, and specifically to cooling generators and generator enclosures.

BACKGROUND OF THE DISCLOSURE

Generator systems, particularly those within enclosures, have traditionally required cooling to avoid overheating and to maintain proper fluid temperature within the radiator. Overheating of the generator system can result in premature shutdown, damage to mechanical components, and reliability risks for motors and fans. Failure to maintain proper fluid temperature within the radiator can result in suboptimal performance of the generator of the generator system.

SUMMARY

In an embodiment, a system for cooling a generator is disclosed. The system includes a generator system. The generator system includes a generator, an enclosure, the enclosure surrounding the generator, and a radiator, wherein the radiator is fluidly connected to the generator. The system also includes a radiator and ventilation fan system. The radiator and ventilation fan system includes a controller. The radiator and ventilation fan system further includes a ventilation fan variable frequency drive (VFD), the ventilation fan VFD in electrical communication with the controller and a ventilation fan in electrical communication with the ventilation fan VFD. The radiator and ventilation fan system also includes a radiator fan VFD in electrical communication with the controller and a radiator fan in electrical communication with a radiator fans VFD. The system also includes temperature sensors, the temperature sensors in electrical communication with the controller.

In another embodiment, a method for cooling a generator includes supplying a radiator and ventilation fan system, the radiator and ventilation fan system. The radiator and ventilation fan system includes a controller. The radiator and ventilation fan system further includes a ventilation fan variable frequency drive (VFD), the ventilation fan VFD in electrical communication with the controller and a ventilation fan in electrical communication with the ventilation fan VFD. The radiator and ventilation fan system also includes a radiator fan VFD in electrical communication with the controller and a radiator fan in electrical communication with a radiator fan VFD. The radiator and ventilation fan system also includes temperature sensors, the temperature sensors in electrical communication with the controller, the temperature sensors including a jacket water engine temperature sensor, an enclosure temperature sensor, and a charge air temperature sensor. The method also includes communicating a value measured by the enclosure temperature sensor to the controller and based on the value measured by the enclosure temperature sensor, changing the voltage or frequency of the power input to the ventilation fan using ventilation fan VFD to achieve a predetermined set point for enclosure temperature.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
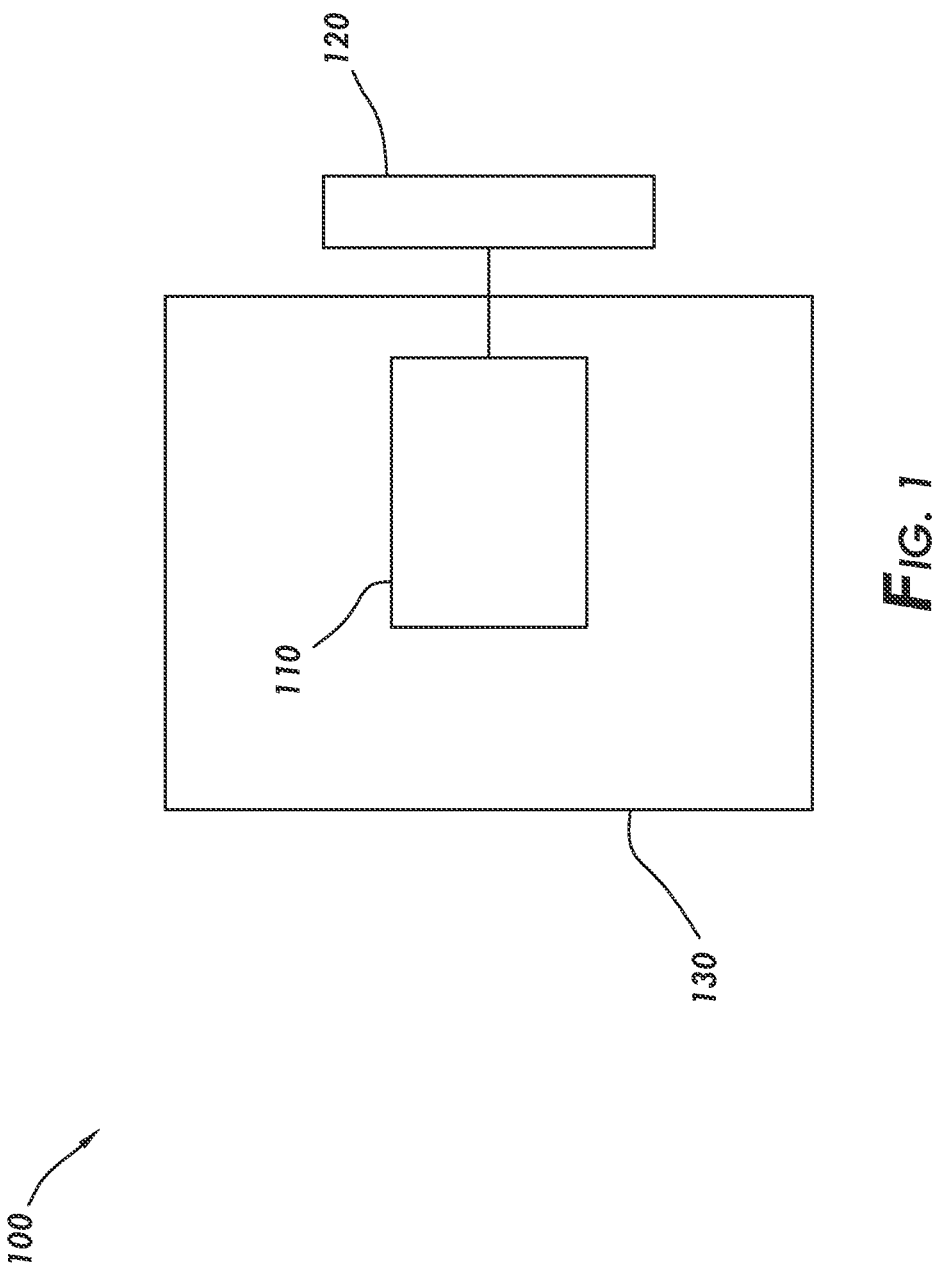
FIG. 1 is a block diagram of a generator system consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of generator system 100. Generator system 100 includes generator 110 surrounded by enclosure 130. Generator 110 may be fluidly connected to radiator 120. In certain embodiments, radiator 120 is outside enclosure 130. In other embodiments, radiator 120 is inside enclosure 130. In certain embodiments, radiator 120 is a stacked core radiator or a split core radiator. In these embodiments, the first of the cores of the radiator cools water circulated through internal passages in the generator 110 to extract and carry away some of the heat produced by the combustion cycle, referred to as jacket water. The second of the cores of the radiator cools a cooling fluid, such as water, that cools the generator air intake air after it is pressurized by the turbocharger. This dual radiator core cooling system may be referred to as separate circuit aftercooled or SCAC.

Figure 2:
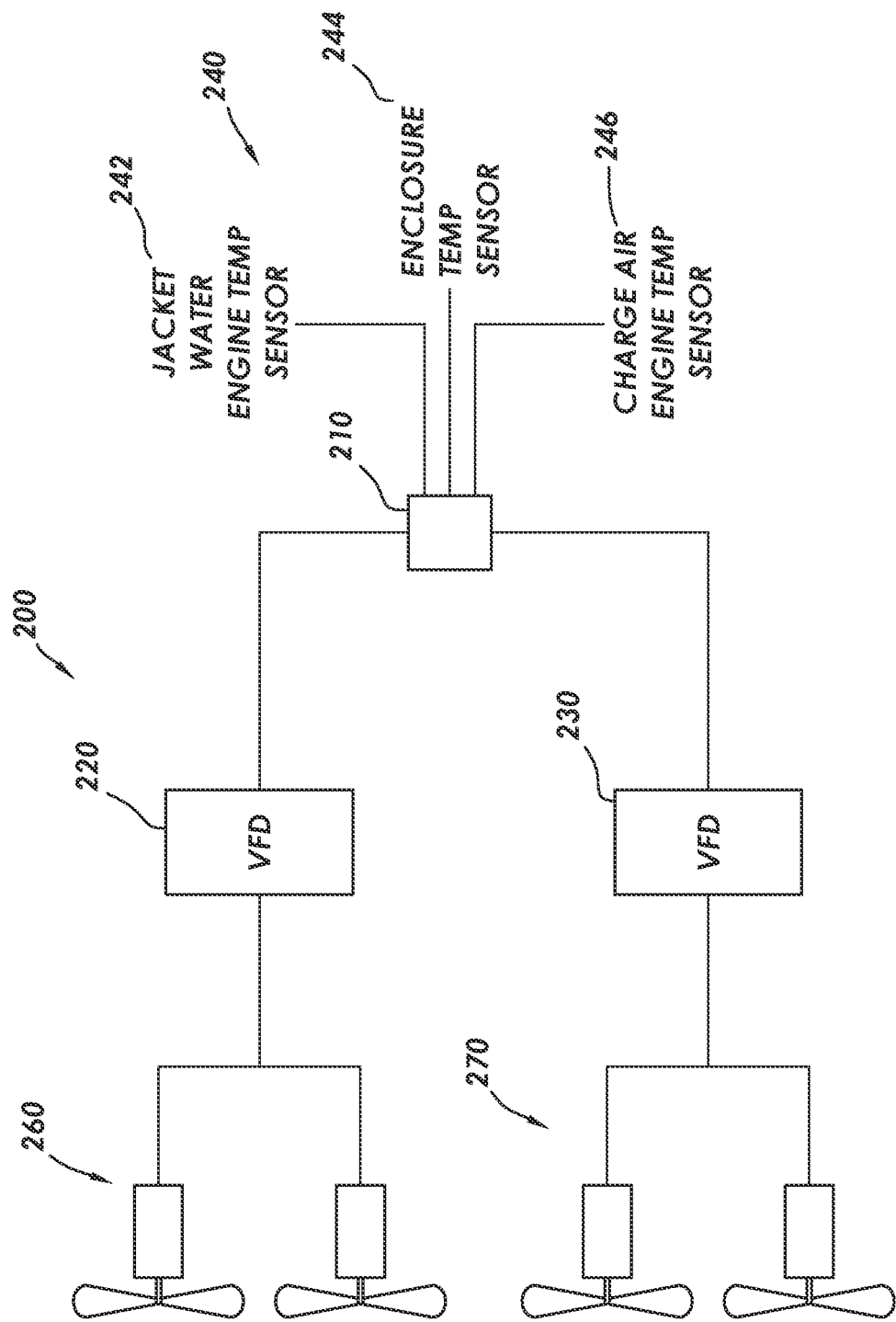
FIG. 2 is a block diagram of a radiator and ventilation fan system for a generator system consistent with certain embodiments of the present disclosure.

FIG. 2 depicts radiator and ventilation fan system 200. Radiator and ventilation fan system 200 includes controller 210. Controller 210 may control the ventilation fan variable frequency drive 220 (referred to hereinafter as ventilation fan VFD 220) and variable frequency drive for the radiator fan 230 (referred to hereinafter as radiator fan VFD 230) based on temperature inputs from temperature sensors 240. In other embodiments, controller 210 may control a radiator fan VFD controller and a ventilation fan VFD controller. Certain non-limiting examples of temperature sensors 240 may include jacket water engine temperature sensor 242, one or more enclosure temperature sensors 244, and charge air temperature sensor 246. Controller 210 may be in electrical communication with temperature sensors 240, ventilation fan VFD 220 and radiator fan VFD 230. Ventilation fan VFD 220 may control one or more electrically-powered enclosure ventilation fans 260 by varying the voltage and frequency of the power input, which results in a change in the motor speed of enclosure ventilation fans 260. In other embodiments, a single ventilation fan VFD 220 may control a single ventilation fan 260, thereby being a ventilation fan VFD 220 for each ventilation fan 260. Similarly, radiator fan VFD 230 may control one or more electrically-powered radiator fans 270 by varying the voltage and frequency of the power input, which results in a change in the motor speed of radiator fans 270. In other embodiments, a single radiator fan VFD 230 may control a single radiator fan 270, thereby being a single radiator fan VFD 230 for each radiator fan 270.

By changing the motor speed of enclosure ventilation fans 260, the enclosure air temperature may be maintained at a set point between, for example and without limitation, −50° F. and 200° F. In certain embodiments, the frequency of the power input to ventilation fans 260 may be between 5 Hz and 60 Hz. By changing the motor speed of radiator fans 270, the operating temperature of the cooling fluids for the generator may be maintained at a set point between, for example and without limitation, 0° F. and 250° F. In certain embodiments, during operation of generator 110, radiator fans 270 are in operation.

Controller logic of controller 210 may depend on the operating parameters of generator system 100 and radiator and ventilation fan system 200. In a non-limiting example, during startup of generator system 100, controller 210 may not recognize any faults or inputs, such as inputs from temperature sensors 240 until the generator is running at a predetermined set point, such as 1000 RPM or greater and for a predetermined time, such as at least 15 seconds. Once these conditions are met, controller 210 reviews all inputs including any faults or alarms. Upon detection of a fault, controller 210 may make several attempts to clear the fault. If the fault cannot be cleared, controller 210 may send a shutdown command to the controls of generator 110. In the alternative, if the fault cannot be cleared controller 210 may send an alarm to an operator or cause ventilation fan VFD 220 and/or radiator fan VFD 230 to operate at maximum speed. Further, in this embodiment, during operation of generator system 100, controller 210 may monitor charge air temperature sensor 246. Depending on the value returned by charge air temperature sensor 246, radiator fans 270 may be controlled using radiator fan VFD 230. For example, when charge air temperature sensor 246 has a low value, such as 90° F., radiator fan VFD 230 may set the speed of radiator fans 270 to 10% fan speed. In addition, for example, when charge air temperature sensor 246 is at a high value, such as 130° F., radiator fan VFD 230 may set the speed of radiator fans 270 to 100% fan speed. Radiator fan VFD 230 may also set the speed of radiator fans 270 based on jacket water engine temperature sensor 242. For example, when jacket water engine temperature sensor 242 returns a low value, such as 160° F., radiator fan VFD 230 may set the speed of radiator fans 270 to 10% fan speed. In addition, for example when jacket water temperature sensor returns a high value, such as 195° F., radiator fan VFD 230 may set the speed of radiator fans 270 to 100% fan speed. In certain embodiments, controller 210 may compare the value of charge air temperature sensor 246 and jacket water engine temperature sensor 242. Controller 210 may communicate to radiator fan VFD 230 the speed of radiator fans 270 based on the percentage of maximum input value, i.e., if the value returned by charge air temperature sensor 246 is closer to its maximum input temperature than the value returned by the jacket water engine temperature sensor 242, controller 210 may set the speed of radiator fans 270 based on the value of charge air temperature sensor 246. In yet another example of the embodiment, depending on the value returned by enclosure temperature sensor 244, enclosure ventilation fans 260 may be controlled using ventilation fan VFD 220. For example, when enclosure temperature sensor 244 has a low value, such as 70° F., ventilation fans VFD 220 may set the speed of enclosure ventilation fans 260 to 10% fan speed. In addition, for example, when enclosure temperature sensor 244 has a high value, such as 110° F., ventilation fan VFD 220 may set the speed of enclosure ventilation fans 260 to 100% fan speed. During shutdown of generator 110, when engine speed is below a certain predetermined value, radiator fan VFD 230 may set the speed of radiator fans 270 to 0% fan speed and ventilation fan VFD 220 may set the speed of enclosure ventilation fans 260 to 90% fan speed until a predetermined condition is met, such as enclosure temperature sensor 244 returning a value of below 110° F. or a time frame, such as one hour, is exceeded.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A system for cooling a generator comprising:
a generator system, the generator system including:
   a generator;
   an enclosure, the enclosure surrounding the generator; and
   a radiator, wherein the radiator is fluidly connected to the generator and wherein the radiator is outside the enclosure;
a radiator and ventilation fan system, the radiator and ventilation fan system including:
   a controller;
   a ventilation fan variable frequency drive (VFD), the ventilation fan VFD in electrical communication with the controller;
   a ventilation fan in electrical communication with the ventilation fan VFD, the ventilation fan adapted to cool air inside the enclosure;
   a radiator fan VFD in electrical communication with the controller;
   a radiator fan in electrical communication with the radiator fan VFD; and
   temperature sensors, the temperature sensors in electrical communication with the controller;
   wherein the controller is adapted to, based on the value measured by the enclosure temperature sensor, change the voltage or frequency of the power input to the ventilation fan using the ventilation fan VFD to achieve a predetermined set point for the enclosure temperature of the air inside the enclosure.

2. The system of claim 1, wherein the radiator is a split core radiator.

3. The system of claim 1, wherein the ventilation fan VFD is adapted to control a speed of the ventilation fan by altering the voltage or frequency of a power input to the ventilation fan.

4. The system of claim 1, wherein the radiator fan VFD is adapted to control a speed of the radiator fan by altering the voltage or frequency of a power input to the radiator fan.

5. The system of claim 1, wherein the controller is adapted to control the ventilation fan VFD based on the enclosure temperature sensor.

6. The system of claim 1, wherein the controller is adapted to control the radiator fan VFD based on a value of temperature sensor that is not the enclosure temperature sensor.

7. A method for cooling a generator comprising:
supplying a radiator and ventilation fan system, the radiator and ventilation fan system positioned outside an enclose, the radiator and ventilation fan system including:
a controller;
a ventilation fan variable frequency drive (VFD), the ventilation fan VFD in electrical communication with the controller;
a ventilation fan in electrical communication with the ventilation fan VFD the ventilation fan adapted to cool air inside the enclosure;
a radiator fan VFD, the radiator fan VFD in electrical communication with the controller;
a radiator fan in electrical communication with the radiator fan VFD;
an enclosure temperature sensor, and a second temperature sensor;
communicating a value measured by the enclosure temperature sensor to the controller; and
based on the value measured by the enclosure temperature sensor, changing the voltage or frequency of the power input to the ventilation fan using the ventilation fan VFD to achieve a predetermined set point for the enclosure temperature of the air inside the enclosure.

8. The method of claim 7, wherein the ventilation fans are in operation when the radiator and ventilation fan system are in operation.

9. The method of claim 8, wherein the predetermined set point for the enclosure temperature is between −50° F. and 200° F.

10. The system of claim 8, further comprising communicating a value measured by the second temperature sensor to the controller;
based on the value measured by the second temperature sensor, changing the voltage or frequency of the power input to the radiator fan using radiator fan VFD to achieve a predetermined set point for a cooling fluid temperature, the cooling fluid associated with the generator.

11. The system of claim 10, wherein the predetermined set point for cooling fluid temperature is between 0° F. and 250° F.

* * * * *